United States Patent
Andarawis et al.

(10) Patent No.: US 8,970,228 B2
(45) Date of Patent: Mar. 3, 2015

(54) ROTATIONAL CLEARANCE MEASUREMENT SYSTEM AND METHOD OF OPERATION

(75) Inventors: Emad Andarawis Andarawis, Ballston Lake, NY (US); Wayne Charles Hasz, Pownal, VT (US); Mahadevan Balasubramaniam, Ballston Lake, NY (US); David Richard Esler, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 168 days.

(21) Appl. No.: 13/485,617

(22) Filed: May 31, 2012

(65) Prior Publication Data

US 2013/0321000 A1  Dec. 5, 2013

(51) Int. Cl.
*G01R 27/26* (2006.01)
*G01B 5/14* (2006.01)
*F01D 11/20* (2006.01)

(52) U.S. Cl.
CPC .. *G01B 5/14* (2013.01); *F01D 11/20* (2013.01)
USPC .......................................... 324/658; 324/662

(58) Field of Classification Search
CPC ............ G01B 5/14; G01B 7/14; G01B 13/12; F01D 11/20
USPC ......... 324/658, 662, 681, 690, 635, 644, 661, 324/699, 716; 415/119; 702/155, 97, 127, 702/158
See application file for complete search history.

(56) References Cited

U.S. PATENT DOCUMENTS

| | | | |
|---|---|---|---|
| 4,196,390 A * | 4/1980 | Pitkin | 324/262 |
| 5,101,165 A * | 3/1992 | Rickards | 324/662 |
| 5,709,338 A * | 1/1998 | Shirai et al. | 228/226 |
| 6,245,066 B1 * | 6/2001 | Morgan et al. | 606/41 |
| 6,490,808 B1 | 12/2002 | Roux | |
| 6,693,418 B2 * | 2/2004 | Kubik | 324/174 |
| 6,717,418 B2 | 4/2004 | Orenstein | |
| 7,180,305 B2 | 2/2007 | Andarawis et al. | |
| 7,215,129 B1 | 5/2007 | Andarawis et al. | |
| 7,332,915 B2 | 2/2008 | Andarawis et al. | |
| 7,333,913 B2 | 2/2008 | Andarawis et al. | |
| 7,554,324 B2 | 6/2009 | Gualtieri | |
| 7,722,310 B2 | 5/2010 | Balasubramaniam et al. | |
| 8,022,715 B2 | 9/2011 | Andarawis et al. | |
| 8,121,813 B2 | 2/2012 | Ren et al. | |

(Continued)

FOREIGN PATENT DOCUMENTS

DE  19705769 A1  8/1998

OTHER PUBLICATIONS

Yu-Zhen., "Tip Clearance Optical Measurement for Rotating Blades", International Conference on Management Science and Industrial Engineering, pp. 1206-1208, Jan. 8-11, 2011.

(Continued)

*Primary Examiner* — Huy Q Phan
*Assistant Examiner* — Raul Rios Russo
(74) *Attorney, Agent, or Firm* — Ann M. Agosti

(57) ABSTRACT

A radial clearance measurement system is provided. The radial clearance measurement system comprises a radial clearance sensor that is relatively insensitive to axial movement of an object rotating relative to the radial clearance sensor. In one embodiment, the radial clearance sensor includes an electrode having a relatively constant overlap area over the range of axial movement of the object.

6 Claims, 9 Drawing Sheets

(56) References Cited

U.S. PATENT DOCUMENTS

2006/0239813 A1    10/2006  Shah et al.
2007/0005294 A1*    1/2007  Andarawis et al. ........... 702/155
2010/0077830 A1     4/2010  Andarawis et al.
2011/0231171 A1*    9/2011  Jousselin .......................... 703/7
2011/0240628 A1*   10/2011  Goretti et al. ................. 219/270

OTHER PUBLICATIONS

Search Report from EP Application No. 13169887.0 dated Jan. 24, 2014.

\* cited by examiner

ROTATIONAL CLEARANCE MEASUREMENT SYSTEM AND METHOD OF OPERATION

BACKGROUND

Various types of rotating machinery include components (such as blades or buckets) that rotate within a space defined by a stationary component or shell. In such machinery it may be of interest, for various operational reasons, to monitor the spacing or clearance maintained between the rotating and stationary components. For example, a steam turbine has a rotating bucket that is disposed adjacent a carrier. The clearance between the rotating bucket and the carrier varies due to various operating conditions, such as changes in temperature, oxidation of the bucket tip, and so forth. It is desirable that a gap or clearance between the rotating bucket and the carrier be maintained during operation of the steam turbine.

Typically turbo machinery has thermal growth that occurs on both the rotating and stationary components, This expansion may occur in both the axial and radial directions and typically it is desired to minimize the clearance (such as the radial clearance) between the rotating components and the housing (e.g., the shell). However, design and operation changes may affect determination of this clearance measurement. One approach employed to determine minimum clearance values is via a soft rub pin with measurements taken during a shut down period, i.e., off-line. Such off-line measurement may be unsuitable for understanding and optimizing clearance in a running turbine system.

BRIEF DESCRIPTION

In one embodiment, a capacitive clearance probe is provided. The capacitive clearance probe includes a probe body and an electrode fitted within the probe body. The electrode comprises a rectangular head having a length selected to be greater than the range of axial movement of a component that rotates relative to the capacitive clearance probe.

In a further embodiment, a radial clearance measurement system is provided. The radial clearance measurement system includes one or more reference features disposed on a rotating component having an otherwise continuous surface geometry. The rotating component is subject to a range of axial displacement along an axis about which the rotating component rotates. The system also includes a radial clearance sensor disposed on a housing held relatively stationary relative to the rotating component. The radial clearance sensor is configured to generate a signal indicative of capacitance between the radial clearance sensor and the rotating component. The radial clearance sensor comprises an electrode having a rectangular head. The length of the rectangular head along the axis is greater than the range of axial displacement of the rotating component. The system also includes a processing unit configured to process the signal to estimate a clearance between the rotating component and the housing.

In an additional embodiment, a clearance sensor assembly is provided. The clearance sensor assembly comprises a radial clearance sensor having a probe body comprising a keying feature and an electrode fitted within the probe body, the electrode comprising a rectangular head. The clearance sensor assembly also comprises a mounting assembly configured to hold the clearance sensor probe. The mounting assembly comprises a cylindrical body comprising a complementary keying feature such that the fit of the probe body within the cylindrical body is restricted and a mounting structure configured to be attached to a housing of a rotating machine assembly. The mounting structure comprises engagement features that correspond to complementary features of the rotating machine assembly such that, when mounted to the rotating machine assembly, a long axis of the rectangular head of the electrode is parallel to an axis of rotation associated with the rotating machine assembly.

DRAWINGS

These and other features, aspects, and advantages of the present invention will become better understood when the following detailed description is read with reference to the accompanying drawings in which like characters represent like parts throughout the drawings, wherein.

Figure 11A:
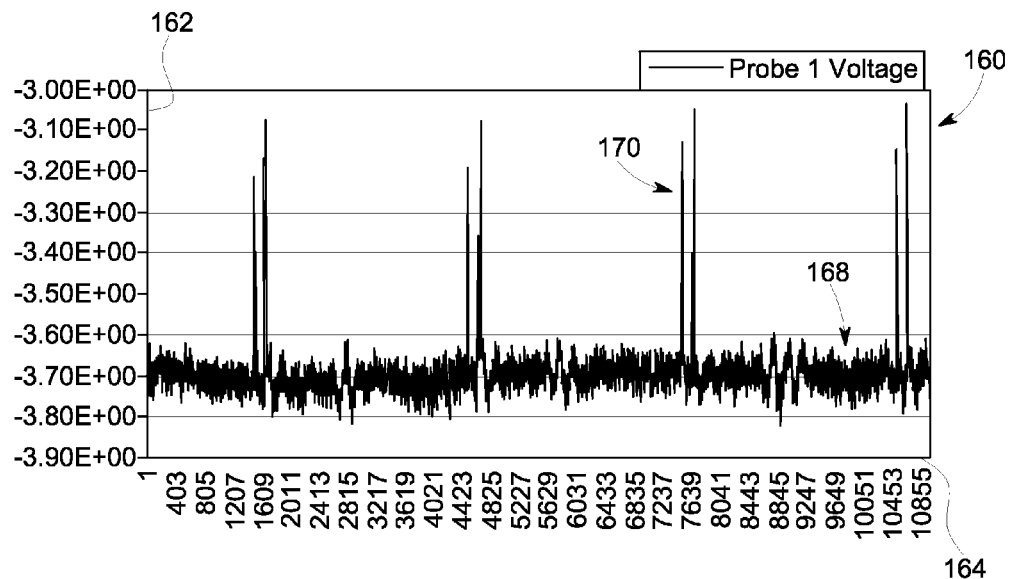
Figure 11B:
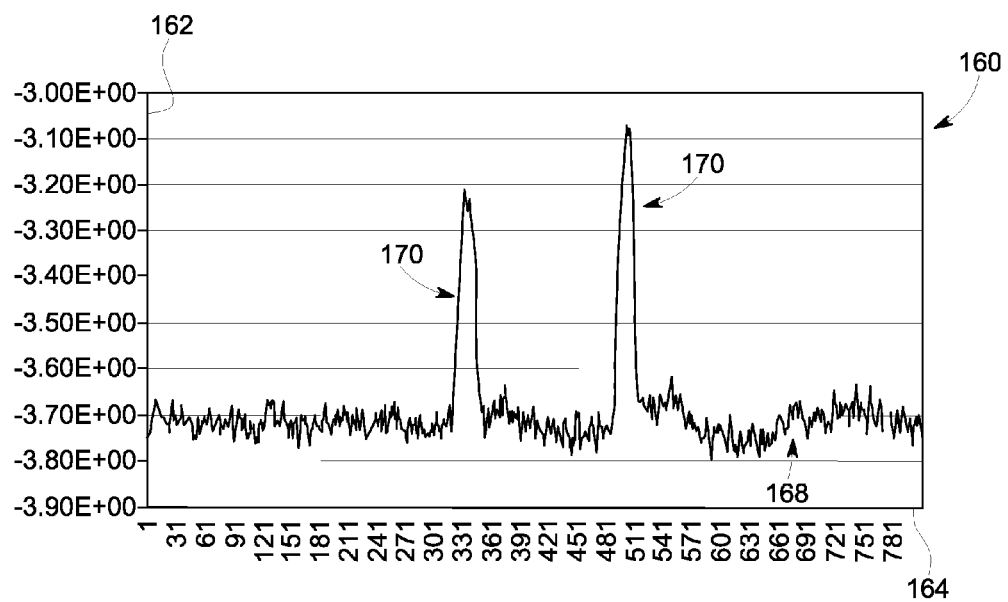
Figure 12:
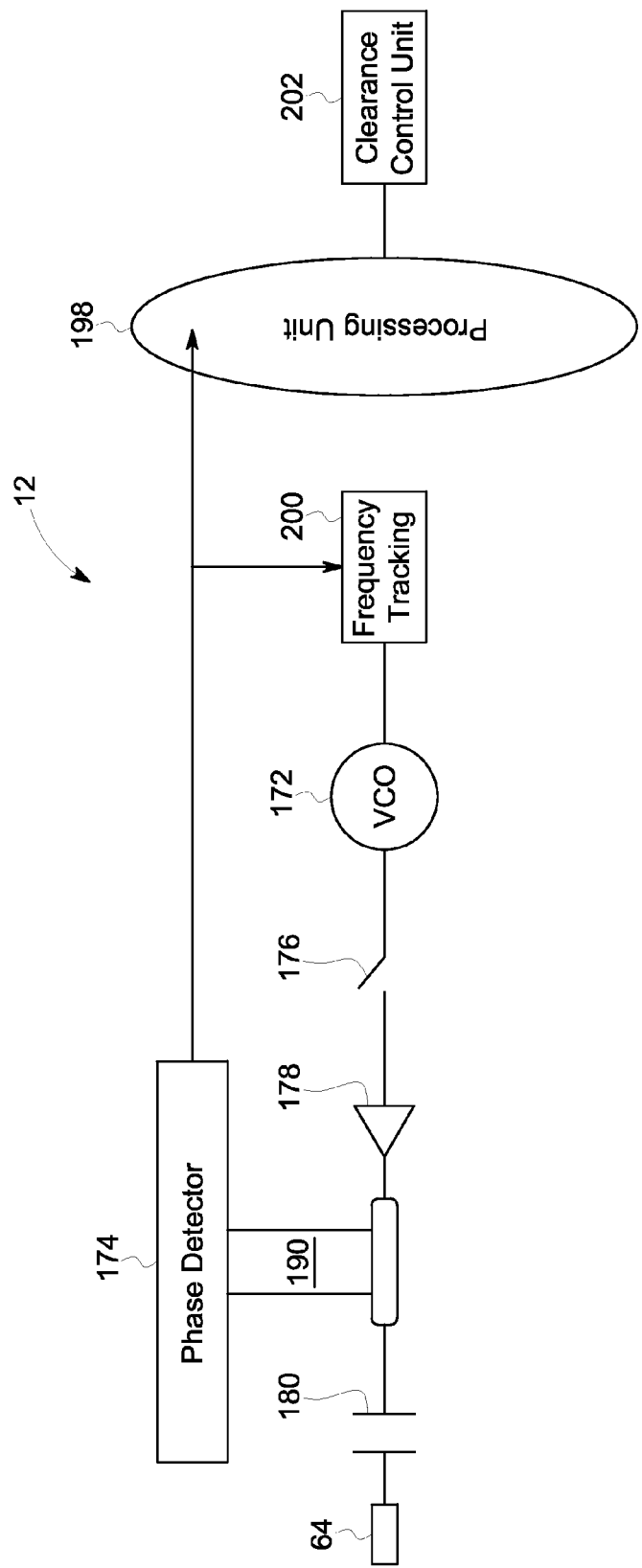

FIG. 11 graphically depicts capacitance measurement over time, in accordance with aspects of the present disclosure; and FIG. 12 is a diagrammatical illustration of a clearance measurement system in accordance with aspects of the present disclosure.

DETAILED DESCRIPTION

As discussed herein, a key metric to the performance of a rotary machine (such as a steam turbine) may be the time to reach an operational state, such as an operating condition that corresponds to power generation. To minimize this time, axial and/or radial clearance data may be evaluated. As discussed herein, one or more clearance sensors may be employed to provide real-time clearance data and to allow monitoring during startup. Data obtained using the clearance sensors may be used for monitoring and evaluation purposes and/or may be integrated with a turbine control system to provide improved capabilities or to enhance reliability and efficiency.

With this in mind, the present disclosure relates to the use of one or more capacitive radial clearance sensors that are insensitive to axial shifts. In particular, since the capacitive measurement is largely a function of both the overlap area and distance between the measured portion of the rotating component and the measurement area of the sensor, uncertainty with respect to the overlap area can cause a clearance estimation error. With this in mind, the radial clearance sensors discussed herein utilize tip and target geometries that are insensitive to axial shifts between the rotating and stationary components that occur during normal system operation. Because the described radial clearance sensor provides radial clearance data without an associated error attributable to axial shifts, substantially simplified processing can be achieved. Additionally, compared to other applications where multiple sensor data must be correlated to obtain clearances, the present disclosure enables standalone, independent processing of the radial clearance data.

Prior to discussing the various embodiments of the present radial clearance sensor that is insensitive to axial shifts, various examples of rotating machinery suitable for use with such a sensor and sensing approach are initially described so as to facilitate subsequent explanation of a clearance sensor and its use. As will be appreciated, specific examples of systems and equipment are provided merely to facilitate explanation and to provide context and, thus, are not intended to limit the scope of the present disclosure to the disclosed examples. Instead, the clearance sensor discussed herein may be used in conjunction with any suitable rotating machinery where radial clearance of a rotating component relative to another component is measured and where insensitivity to axial motion is desired.

Figure 1:
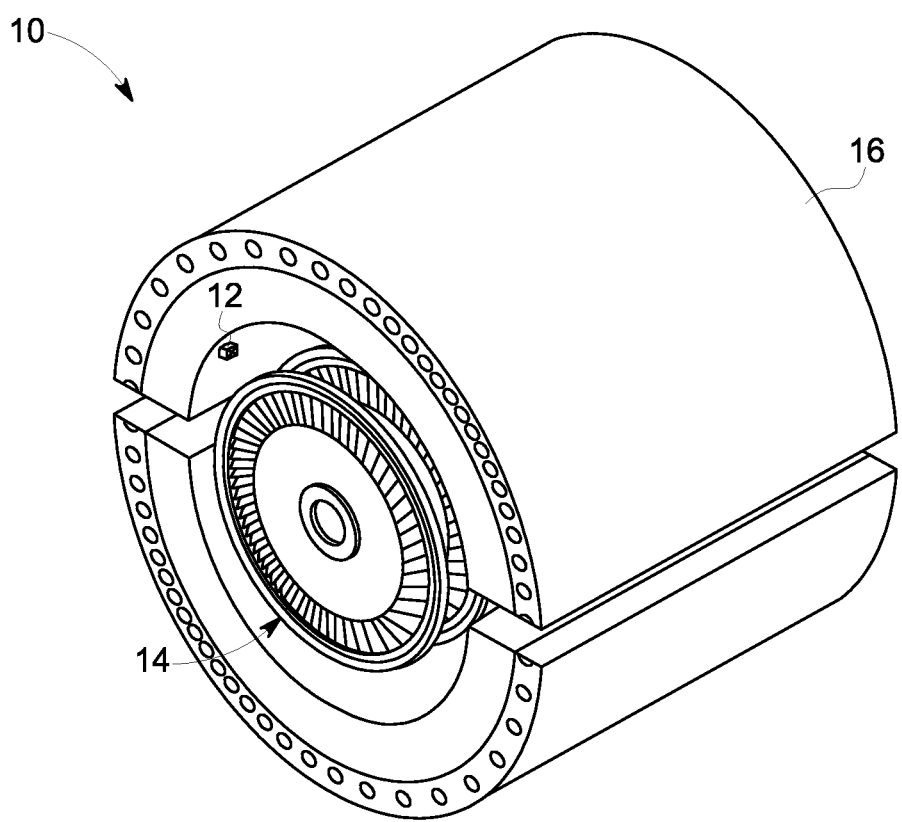
FIG. 1 is a diagrammatical perspective illustration of a steam turbine having a clearance measurement system in accordance with aspects of the present disclosure.

As discussed herein, embodiments of the present sensor and measurement disclosure may be used to provide an accurate measurement of radial clearance between two objects in various rotating systems, such as a steam turbine, a pump, a compressor, a generator, a turbine engine (e.g., airplane turbine engine), a machine having rotating components and so forth. Referring now to the drawings, FIG. 1 illustrates a steam turbine 10 having a clearance measurement system 12 for measuring a radial clearance between two objects in the steam turbine 10. In the illustrated embodiment, the clearance measurement system 12 is configured for measuring the radial clearance between a rotating component 14 and a housing or shroud 16 of the steam turbine 10 that is relatively stationary compared to the rotating component when the rotating component is in operation.

Figure 2:
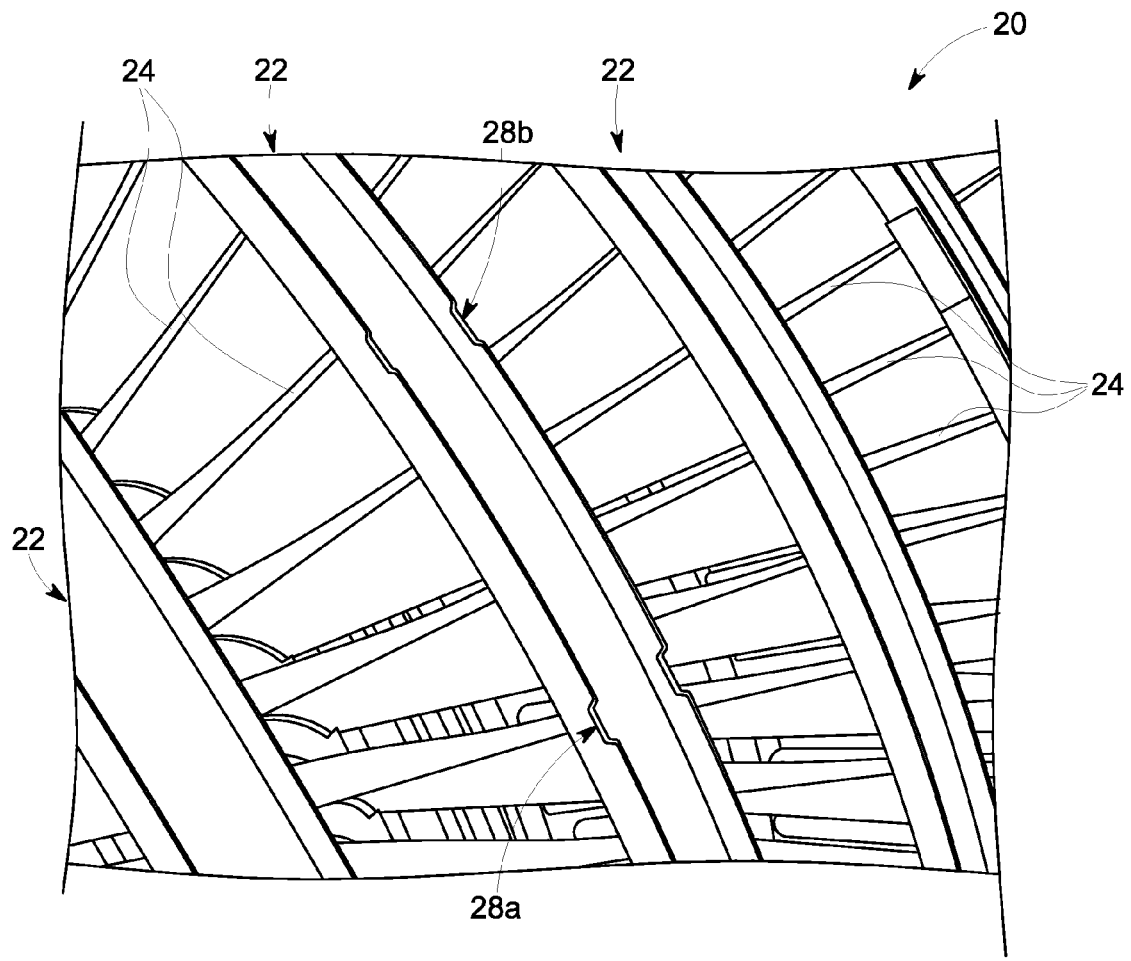
FIG. 2 is a partial diagrammatical perspective illustration of rotating buckets of the steam turbine of FIG. 1 in accordance with aspects of the present disclosure.

Turning to FIG. 2, a partial diagrammatical perspective of a rotating component, such as a rotating bucket assembly 20 of the steam turbine of FIG. 1, is illustrated. In the illustrated embodiment, the rotating bucket assembly 20 is arranged in a configuration having different stages 22 within the housing 16. It should be noted that the housing 16, which is disposed about the stages 22, is not shown so as to allow visualization of the bucket assembly 20. The stages 22 within the housing 16 include a plurality of rotating buckets 24 longitudinally spaced apart from one another along the length (and axis of rotation) of the steam turbine 10 of FIG. 1. In addition, the rotating buckets 24 are radially spaced apart from the housing 16 (as depicted in FIG. 1). In other words, the outer diameter of the rotating buckets 24 is smaller than the inner diameter of the housing 16. Therefore, a relatively small clearance exists between the outer circumference of the rotating buckets 24 and the inner surface of the housing 16. Further, with the exception of the clearance control features (e.g. notches 28) discussed in detail below, the rotating buckets 24 form a continuously circular structure (here depicted as a knife edge with spaced apart notches 28) about an axis of rotation of the rotating buckets 24. In one implementation, a notch 28 may have an axial length (i.e., a length in the direction of the axis of rotation) that is approximately 0.050 inches to 0.200 inches (approximately 1.27 mm to 5.08 mm). As will be appreciated, the configuration of the notches 28 may vary and may include implementations where a notch has generally linear or straight sides as well as other implementations where the edges and/or corners of a notch include some degree of curvature, including embodiments where a notch 28 is a partial circle.

In this embodiment, the clearance measurement system 12 (see FIG. 1) is configured to measure the radial clearance between the hosing 16 (i.e., a relatively stationary component) and the rotating component 24 (e.g., rotating buckets). In certain embodiments, the clearance measurement system 12 may be employed to measure the clearance between the housing and rotating components in a generator or other rotating machinery. Indeed, measurement of radial clearance in other rotating machinery having a rotating component that is radially spaced apart from a carrier or housing component, stationary or otherwise, is within the scope of the present disclosure.

As discussed herein, the clearance measurement system 12 is configured to convert direct current based capacitive measurements between the housing 16 and rotating components 14 to time-varying capacitive measurements. The clearance measurement system 12 performs this conversion based on at least one reference feature or structure (e.g., a notch 28, groove, slot, etc.) that is discernible on the portion of the rotating component undergoing capacitance measurement. For example, the reference feature or structure may interrupt the continuity of an otherwise continuous surface geometry (e.g., continuously circular geometry) of the rotating component about an axis of rotation. Such time-varying capacitive measurements are used for estimating the radial clearance between the rotor component 14 and the surrounding housing 16, as will be described in a greater detail below.

Figure 3:
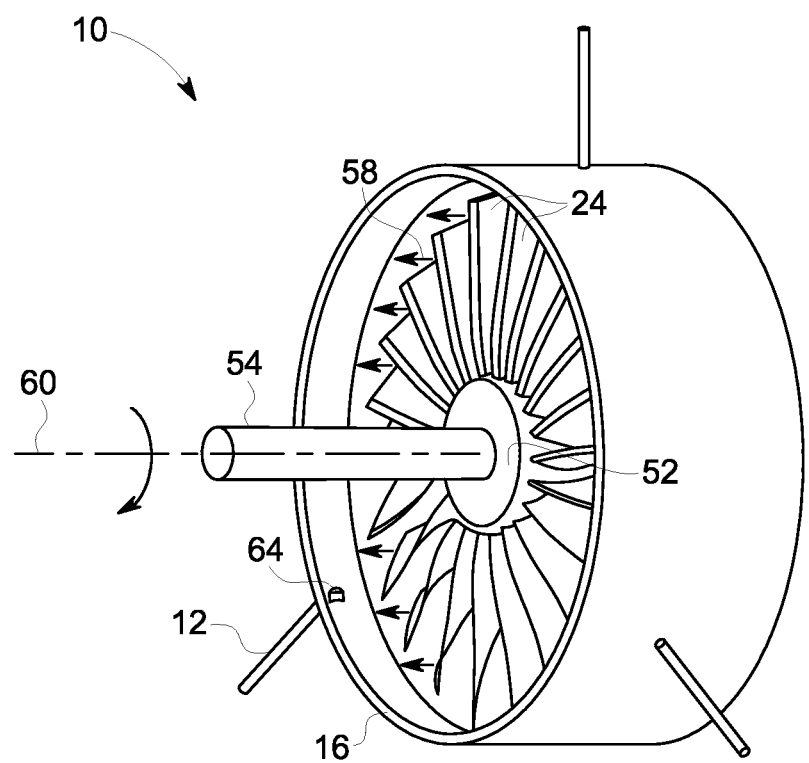
FIG. 3 illustrates a perspective view of the steam turbine of FIG. 1 having a clearance measurement system for measuring the clearance between the rotating buckets and the housing in accordance with aspects of the present disclosure.

Turning to FIG. 3, a rotating machine, such as a steam turbine 10 as illustrated in FIG. 1, is illustrated that incorporates a radial clearance measurement system 12 as discussed herein. The steam turbine 10 includes a rotating component 14, having a rotor 52 mounted on a shaft 54. A plurality of turbine blades (e.g., buckets 24) are affixed to the rotor 52. In operation, the blades are subject to steam 58 at a high temperature and pressure, which causes the blades to rotate about an axis 60. The blades (i.e., buckets 24) rotate within a housing 16 or shroud that is positioned radially and circumferentially around the blades. A relatively small clearance exists between the blades and the housing 16 to facilitate rotation of the blades within the housing 16, while also preventing excessive leakage of the working fluid, i.e. steam, between the blades and the housing 16. A sensor or probe tip 64 of each radial clearance sensor assembly 12 is disposed within and circumferentially around the stationary shroud 62. In the illustrated embodiment, the radial clearance sensor assemblies 12 include capacitive probes. As explained below, each of the sensor assemblies 12 is configured to generate a signal indicative of a radial position of the blades with respect to the housing 16 at respective circumferential locations.

Figure 4:
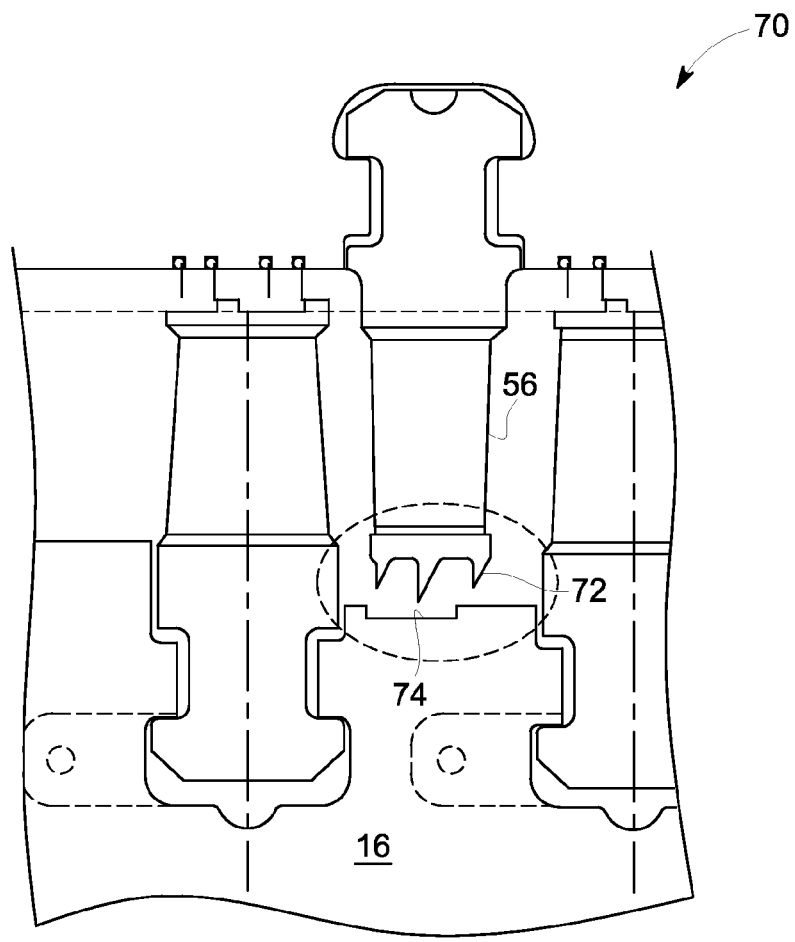
FIG. 4 is a cross-sectional view of a portion of the steam turbine of FIG. 3 where the present clearance control technique can be used in accordance with aspects of the present disclosure.
Figure 5:
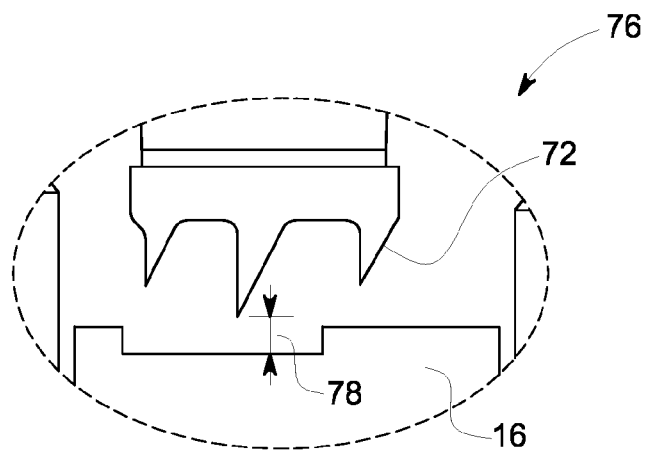
FIG. 5 is a detailed cross-section view of FIG. 4 in accordance with aspects of the present disclosure.

Referring now to FIG. 4, a cross-sectional view is shown for a portion 70 of the steam turbine 10 of FIG. 3. In the illustrated embodiment, a knife-edge type seal is illustrated in which the edge or tip 56 of the rotating component 14 (such as a stage 22) includes packing teeth or seal teeth 72 that mesh into a groove 74 provided on the inner circumference of the housing 16. In one embodiment, the clearance measurement system 12 (see FIG. 1) may be coupled to the housing 16 for measuring the radial clearance between the circumferential edge or tip 56 of a stage 22 of the rotating component 14 and the housing 16. Turning to FIG. 5, a detailed cross-section view of a portion 76 of the housing 16 and edge (e.g., teeth 72) of the steam turbine 10 of FIG. 4 is depicted. As illustrated, the radial clearance between the seal teeth 72 and the housing 16 is represented by reference numeral 78.

In certain embodiments, due to differences in the rate of thermal expansion of the housing 16 and the rotor 52, there is a potential that the radial clearance 78 may be reduced to zero, leading to interference between the seal teeth 72 and the groove 74. Therefore, in certain embodiments, the probe is mounted so as to be slightly recessed with respect to the surface of the shroud 62, so as to prevent such interference events (i.e., rubs) during rotation of the buckets 24. Similarly, the probe (and probe tip 64) may be configured to be pulled back a configurable or set distance relative to the surface of the shroud 62 during operation to prevent such interference events. In such implementations, the probe may also be pulled back relative to the surface of the shroud 62 during assembly to facilitate placement and connection of the various components of the system.

The present disclosure allows on-line measurement of radial clearance 78, which may be incorporated into a closed-loop control strategy to maintain radial clearance at values within acceptable limits. The control strategy may include, for example, thermal actuation of the housing 16, causing it to appropriately expand when the clearance between the housing 16 and the seal teeth 72 decreases. In this embodiment, thermal actuators utilize the property of thermal expansion to produce movement or expansion of the housing 16 relative to the rotating buckets 24.

Turning to aspects of radial clearance measurement, as discussed herein, the capacitance between two objects is measured. This capacitance measurement is a function of both the overlap of surface area and the separation (i.e., clearance) between the two objects. For example, in one embodiment the capacitance between the edge or tip 56 of the rotating component 14 and the housing is a function of the radial clearance 78 between the edge 56 of the rotating component undergoing measurement (e.g., a stage 22) and a sensor or probe tip 64 embedded within the housing 16. As the rotating component 14 expands radially, the radial clearance 78 between the seal teeth 72 along the edge or tip 56 of a stage 22 and the housing 16 changes. These changes in the radial clearance 78 will result in a change in measured capacitance. As discussed herein, the change in capacitance can be correlated to radial displacement and hence a radial clearance measurement may be obtained. The measurement of radial clearance 78 via the clearance measurement system 12 will be further described below.

Figure 6:
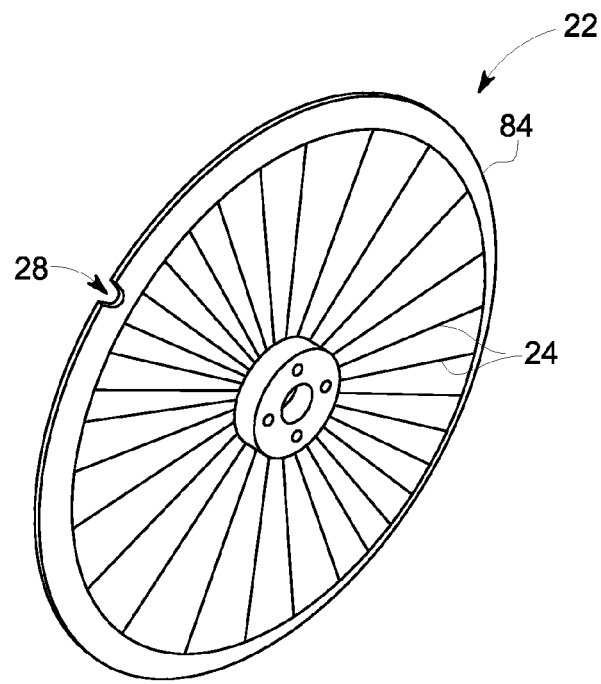
FIG. 6 illustrates a stage of a rotating component with a notch, in accordance with aspects of the present disclosure.

Turning to FIG. 6, a portion (e.g., a stage 22) of a rotating component 14 for use in a steam turbine is illustrated with a notch 28 (i.e., a reference feature or structure). In the illustrated embodiment, the rotating portion includes a plurality of blades or buckets 24 connected or attached circumferentially to form a generally continuous and circular edge 84 about the axis of rotation. The circumferential edge 84 also includes one or more notches 28 or other reference features interrupting the continuity of the otherwise continuous circular edge 84. Examples of suitable reference features include recesses, such as indents, notches, grooves, slots, and so forth. In other embodiments, two or more notches 28 may be present on the edge 84 and the certain of the notches 28 may have different characteristic depths relative to the remainder of the edge 84. For example, as depicted in FIG. 2 and as discussed in subsequent examples herein, the edge 84 may be provided as a knife-edge seal having two (or more) notches 28 along the circumferential edge 84, with the at least two of the notches 28 having different depths relative to the remainder of the edge 84.

In operation, the sensor assembly 12 (see FIG. 3) attached to the housing 16 generates a signal corresponding to the measured capacitance between the rotating component 14 (or a particular stage 22 of the rotating component 14) and the housing 16. The capacitance measured by the sensor assembly 12 may in turn be processed to estimate the radial clearance between the housing 16 and rotating component 14 or respective stage 22. In certain embodiments, the tip 64 of the sensor assembly 12 is configured so as to be substantially insensitive to axial movement or displacement of the rotating component 14 relative to the housing 16 during measurement.

In particular, as noted above with respect to axial displacement, the measurement of capacitance between the housing 16 and the rotating component 14 (e.g., stage 22) is at least partly a function of the overlap between these structures. To the extent that the capacitance measurement is based on the interaction between the probe tip 64 and an edge or circumferential region of the rotating component 14, the area of overlap between the probe tip 64 and the measured edge is a factor in the capacitance measurement. Therefore, uncertainty with respect to the overlap area between the probe tip 64 and the portion of the rotating component 14 being sensed may result in a clearance estimation error.

For example, in conventional approaches the sensing portion of the probe tip 64 may be circular (though other non-elongate configurations, such as triangular or trapezoidal probe tips. may also be employed). In such implementations, as the knife-edge seal formed by teeth 72 move axially with respect to the housing 16 during operation, the overlap area between the teeth 72 and a circular probe tip disposed within the housing changes. That is, axial displacement of the teeth 72 relative to a circular probe tip will cause the effective area of overlap between the circular probe tip and the edge of the rotating component to vary. Thus, the accuracy of the capacitance measurements corresponding to radial clearance 78 may be subject to axial shifts or displacements of the rotating component 14 to the extent such axial motion alters the effective overlap area between the probe tip and the measured edge portion of the rotating component 14.

To address such uncertainty in the overlap area between the sensor probe tip 64 and the portion of the rotating component 14 undergoing measurement, certain embodiments discussed herein utilize a probe tip and target geometries that reduce or eliminate the uncertainty related to overlap area, and thus are insensitive to axial shifts or displacement of the rotating component 14 relative to the housing 14 during operation.

Figure 7:
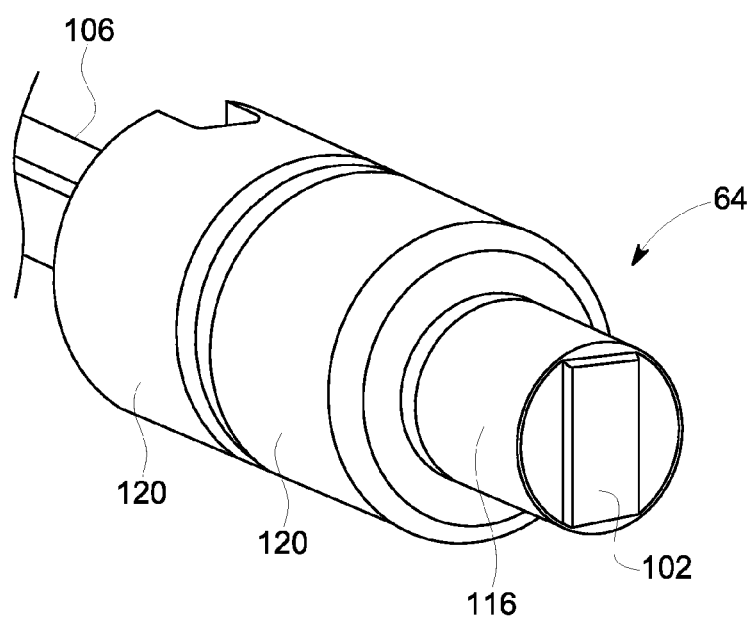
FIG. 7 depicts a perspective view of a probe tip of a radial clearance sensor, in accordance with aspects of the present disclosure.
Figure 8:
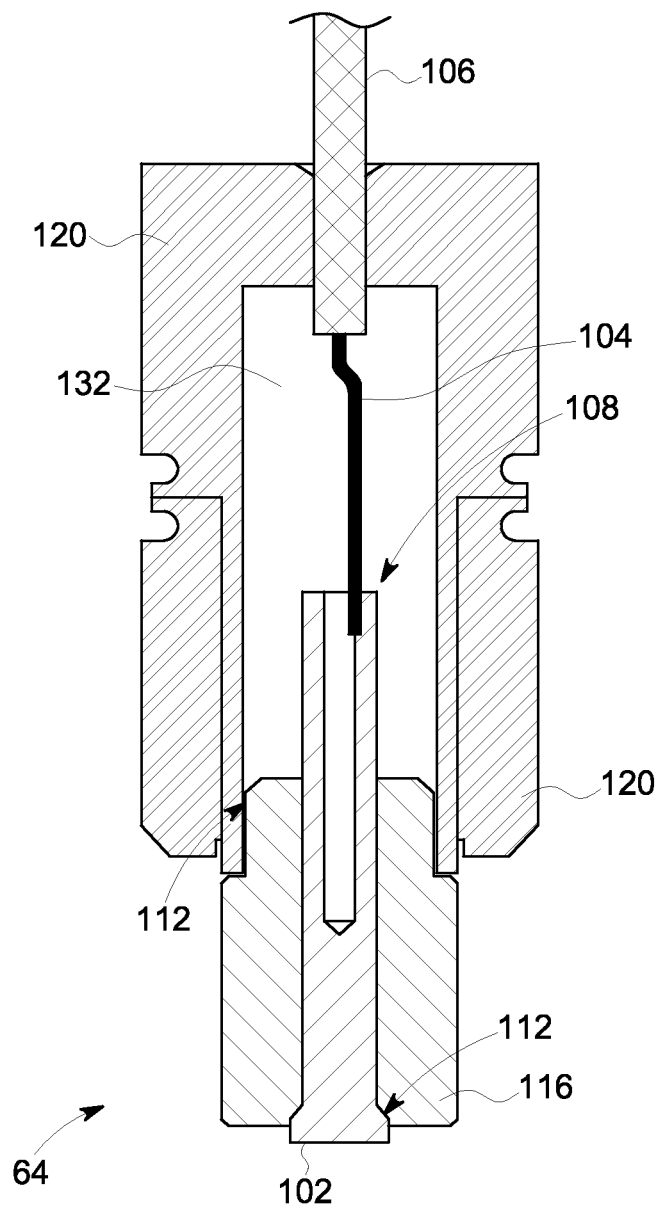
FIG. 8 depicts a cut-way view of a probe tip of a radial clearance sensor, in accordance with aspects of the present disclosure.

For example, turning to FIGS. 7 and 8, an example of one embodiment of a probe tip 64 of a radial clearance measurement system 12 is depicted. In this example, a "nail head" type probe electrode 102 is employed having a rectangular shaped tip. For example, in one embodiment the rectangular tip of electrode 102 has dimensions of about 200 mil by 100 mil (i.e., approximately 5.08 mm by 2.54 mm), where the long dimension (i.e., the length) runs parallel to the axis of rotation of the rotating component 14 and the narrower dimension (i.e., the width) runs parallel to the circumferential edge 84 of a portion of the rotating component (e.g., a stage 22) undergoing measurement. In other embodiments, the probe tip 64 includes an electrode 102 that has a 0.400 inch (approximately 10.16 mm) length in the axial direction. In further implementations, the electrode 102 at the probe tip 64 may have an axial length of about 2.0 inches (approximately 50.8 mm) or less. In general, the aspect ratio of axial length of a notch 28 or other reference feature on the rotating component 14 to the axial length of the probe tip 64 may be from about 1:2 to about 1:8.

A consequence of this elongation of the head of the electrode 102 is that a substantially uniform cross-section is provided in the axial direction relative to the portion of the rotating component 14 undergoing measurement (such as a knife-edge seal). As a result, axial shifts of an edge 84 or other portion of the rotating component 14 relative to the head of electrode 102 will have a substantially constant overlap area relative to the electrode 102, rendering the radial clearance measurement system 12 relatively insensitive to axial shifts of the rotating component 14. Further, due to the axial insensitivity of the clearance measurement system 12 having a probe tip 64 as described, variations in measured capacitance can be attributed largely or solely to changes in radial clearance 78, as the overlap area between the electrode 102 and the monitored edge 84 of the rotating component 14 is held relatively constant. In certain implementations, the length of the head of the electrode 102 in the direction parallel to the axis of rotation is as long or longer than the anticipated or potential axial displacement of the edge 84 undergoing measurement. However, in certain embodiments the length of the head of the electrode 102 in the direction parallel to the axis of rotation may be slightly shorter than the anticipated or potential axial displacement of the edge 84 undergoing measurement. In such an embodiment, the electrode 102 still provides an effectively constant overlap area due to the associated fringe fields that effectively allow the capacitive probe to monitor an area that is slightly larger than the actual area associated with the electrode 102.

Further, it should be appreciated that, though a rectangular shaped electrode head is discussed herein by way of example, other electrode head shapes may be employed so long as the overlap area in the axial direction is effectively constant throughout the range of potential axial displacement. For example, the head of electrode 102 may be shaped as a square or oval in certain other implementations so long as the overlap area between the electrode 102 and measured edge 84 is effectively constant in the range of expected axial displacement.

In addition, with respect to other dimensions of the head of electrode 102, in implementations where a notch 28 or other reference feature is provided on the portion of the rotational component 14 undergoing measurement (such as an edge 84 of a stage 22), it may be desirable that the width of the electrode 102 be less than the corresponding feature. For example, in an implementation where a notch 28 is provided on a circumferential edge 84 of a rotating component, it may be desirable that the width of the notch (as measured in the radial or circumferential direction) exceed the width of the head of the electrode 102 in the same direction by some factor (e.g., 20%) such that the electrode head "fits" within the notch 28 or other structural feature in the circumferential direction. In such an example, the entire width of the electrode head is encompassed within the width of the notch 28 or other feature at some point during each rotation of the rotating component, thereby insuring that the capacitance measurement in indicative of the distance from the electrode 102 to the bottom surface of the notch 28 or other feature.

In one implementation, the probe tip 64 is hermetically sealed and the electrode 102 is a hollow electrode (such as a hollow platinum electrode) having a hollow inner diameter. In other embodiments, the electrode 102 may be solid instead of hollow. In practice use of a hollow electrode may be useful in applications where it is desired to reduce structural stress between components of the probe tip 64, such as at braze joints and/or ceramic metallization. Further, in the depicted example one or more braze joints are chamfered (see chamfered fits 112). In one implementation where braze joints are employed for connecting components of the probe tip 64, the probes may be brazed vertically in a vacuum furnace such that gravity and chamfers aid the flow of liquid braze during the manufacturing process.

In one embodiment, a conductor 104 (such as a platinum center electrode) of a connected cable or wire 106 (such as a coaxial cable or hard line) may be welded (e.g., spot weld 108) to the electrode 102. The conductor 104 and cable 106 allow signals to be read out from the electrode 102 and communicated to downstream processing components that process the signals to monitor capacitance over time, as discussed below.

By way of example, a sensor probe tip 64 was built using BAU4 gold nickel braze alloy, 94% alumina ceramic molybdenum manganese metallization (for attachment of ceramic head piece), platinum electrodes 102, platinum center conductor 104 within a stainless steel jacket 321 semi-rigid coaxial cable 106, and a stainless steel 446 probe body 120. In certain implementations, a groove or other conformal recess may be milled in the ceramic head piece 116 to fit the rectangular tip of the electrode 102.

Figure 9:
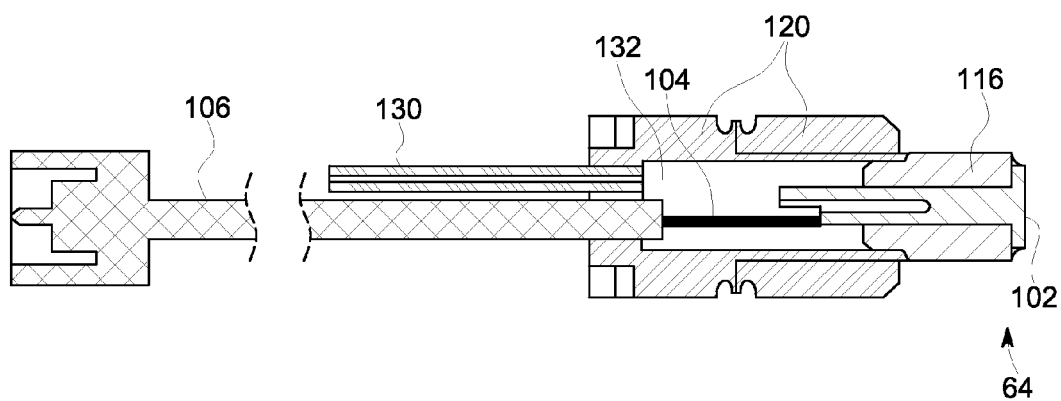
FIG. 9 depicts a cut-way view of a probe tip including a leak tube, in accordance with aspects of the present disclosure.

As noted above, in certain implementations the probe tip 64 is hermetically sealed. To test the hermetic seal on a probe tip 64, a leak tube 130 (FIG. 9) may be incorporated into the back cavity 132 of the probe. In such implementations, the leak tube 130 may be used to pull vacuum for hermeticity testing. One such hermeticity test measures helium leak rate. For example, hermiticity may be determined to be sufficient if a helium leak rate of $1 \times 10^{-8}$ atm cc/sec or lower is achieved. Once leak testing is completed, and the probe tip 64 is determined to be hermetically sealed, the leak tube 130 may be welded shut.

Figure 10:
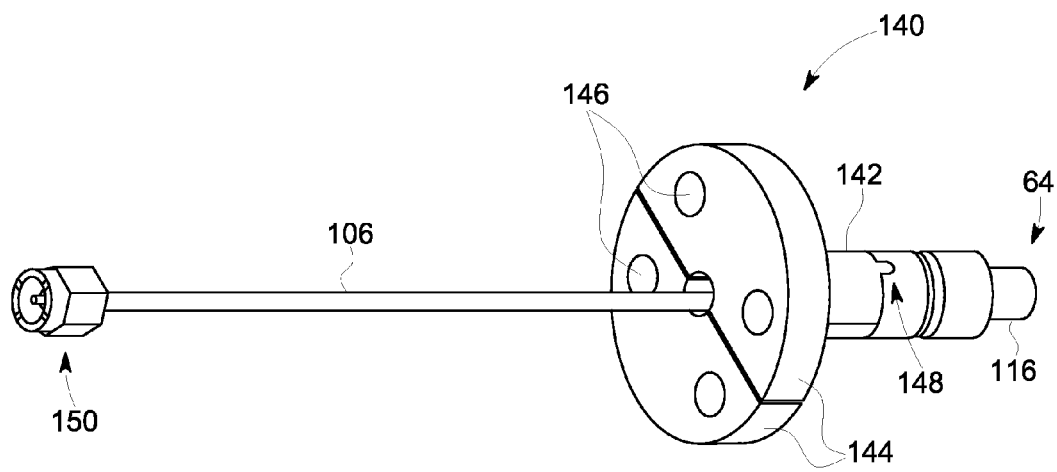
FIG. 10 depicts a mount assembly and probe tip, in accordance with aspects of the present disclosure.

Turning to FIG. 10, an example of a mount assembly for attaching the sensor probe to a housing 16 of a rotary machine is depicted. In the depicted embodiment, the mount assembly 140 is provided as a split retainer ring. The mount assembly 140 engages with the sensor probe and provides keying to keep the axial length of the rectangular electrode tip 102 parallel to the axis of the turbine rotor. In one embodiment, the mount assembly 140 may be manufactured from a cylindrical body 142 that is machined with a flange 144 having holes 146 that correspond to threaded holes on the housing 16. In one implementation, a pair of holes 146 is symmetric on the mount assembly 140, allowing 0° of 180° of rotation only and preventing a 90° or 270° degree probe orientation would not occur. Features (e.g., tabs 148) at the end of the cylindrical body 142 may be provided that key to complementary features on the probe tip 64. In one implementation the probe tip 64 is seated on a counterbore and bolt torque provides compressive load on the probe tip 64. In implementations where the connector 150 dimensions exceed the inner diameter of the mount assembly 140, the mount assembly 140 may be manufactured in pieces, such as the depicted split retaining ring assembly, rather than as a single piece. Alternatively, the mount assembly 140 may be initially manufactured as a single piece but may be split, such as using electrical discharge machining or other suitable approaches.

With the foregoing details regarding the probe and probe tip in mind, in certain implementations a direct current based capacitive measurement is acquired between the between the housing 16 and rotating component 14 as discussed herein. As will be appreciated, as the radial clearance increases between the housing 16 and the rotating component 14, the difference between the capacitance measurements corresponding to the generally circular edge 84 of the rotating component 14 and to the reference feature (e.g., notch 28) will decrease. Similarly, as the radial clearance decreases such difference between the capacitance measurements will increase. That is, the sensed capacitances are inversely proportional to the clearance between the housing 16 and rotating component 14. By way of example, in one implementation, if the clearance between the housing 16 and the rotating component 14 doubles, the difference between the baseline and peak capacitances will be reduced by a factor of 0.5.

In implementations where one or more notches 28 or other reference features are provided on the portion of the rotating component 14 undergoing measurement, such capacitive measurements may be converted to time-varying capacitive measurements based on the periodic translation of the reference feature or features (e.g., notch 28) past the probe tip 64. For example, FIG. 11 graphically depict a capacitance 160 as measured over time by the clearance measurement system 12 having a probe tip 64 embedded in the housing 16. The ordinate axis 162 of the capacitive measurements represents the capacitance value sensed by the sensor assembly 12 and the abscissa axis 164 represents the time period.

In a present embodiment, a baseline portion 168 of the signal generated by the sensor assembly 12 corresponds to the capacitance measured for a generally circular edge portion 84 of the rotating component 14. The peak or elevated portions 170 of the signal generated by the sensor assembly 12 corresponds to the capacitance measured when a notch 28 translates past the sensor assembly 12, thereby providing a temporal reference point for the acquired capacitance data 160. In certain implementations, the amplitude of the peak portion 170, as measured relative to the baseline portion 168, corresponds to the depth of the reference feature, (e.g., notch 28). That is, the difference between the amplitudes of the baseline portion 168 and peak portion 170 and the pre-determined or known depth of the reference feature may be utilized to determine the clearance between the housing 16 and the rotating component 14 during operation of the rotating machinery (i.e., while the rotating component is rotating relative to the housing).

In the depicted example, the upper graph depicts a series of four rotations of a circular edge 84 of a rotating component past a probe tip 64 embedded in a housing 16, where the circular edge 84 includes two spaced apart notches 28 having different depths. As will be appreciated, the speed of the measurement system increases by employing multiple notches 28 (or other reference features) as multiple differences between the sensed parameters (i.e., capacitances) are obtained for every rotation of the rotating component 14. In certain embodiments, such multiple differences may be employed as a means for self-calibrating the clearance measurement system 12. The lower graph of FIG. 11 depicts a close-up of one rotation of the circular edge 84 of the rotating component past the probe tip 64 and provides a more detailed view of the difference in observed capacitance. The difference in the depth of the notches 28 is observable in the different peak amplitudes 170 associated with the respective notches 28.

With the foregoing in mind, FIG. 12 illustrates an example of a configuration of a clearance measurement system 12 as discussed herein. The clearance measurement system 12 includes a probe having a probe tip 64 with a rectangular or other configuration of electrode 102 providing a constant overlap area along the axial direction of a rotating machine. Further, a signal generator 172 is coupled to the probe tip 64 to provide input excitation signals to the probe. In the illustrated embodiment, the signal generator 172 includes a voltage-controlled oscillator (VCO). The excitation signal from the signal generator 172 may be switched or otherwise controlled in application to the probe tip 64 through a switch 176, though in certain embodiments, the switch 176 may be absent.

Moreover, an amplifier 178 may be coupled to the signal generator 172 to amplify input signals received by the probe tip 64. In the illustrated embodiment, a capacitor 180 and a phase detector 174 are coupled to the probe tip 64 for measuring the capacitance through the probe tip 64. Further, directional coupler 190 may be coupled to the probe tip 64 for separating incident and reflected signals from the respective probe tip 64.

In operation, the probe tip 64 is excited by the signal generator 172 at an excitation frequency. The excitation frequency may be selected based upon a wire length, capacitance, geometry of probe tip 64, a static measurement capacitance, and other factors. In a present embodiment, the phase detector 174 is configured to detect the phase difference between reflected signals from the probe tip 64 and the excitation signal from the signal generator to generate a signal representative of a measured capacitance. In particular, the capacitance through the probe tip 64 is measured by measuring a phase difference between the excitation signal and the corresponding reflected signal using the capacitor 180 and the phase detector 174.

The signals generated from the probe may be then processed via a processing unit 198. Further, the frequency of the excitation signals from the signal generator 172 may be tracked and controlled via a frequency tracking unit 200. In operation, the processing unit 198 receives signals representative of sensed capacitances corresponding to the rotating component 14 and the reference features disposed on the rotating component 14. Further, the processing unit 198 estimates the clearance between the rotating component 12 and housing 16 based upon the measurement difference between the sensed capacitances from the rotating component 14 and the reference features (e.g., notches 28). More specifically, such sensed capacitances are processed to determine the clearance between the housing 16 and rotating component 14 based upon the measurement differences and the pre-determined sizes of the reference features.

The measurements based upon the reference features (e.g., notches 28) having pre-determined size substantially reduces the effect of any noise components in the measurement by factors such as drifts in the electronics, changes in the material properties of the housing 16 and rotating component 14 and so forth. In the illustrated embodiment, the noise components may manifest equally among all the measurements and are subsequently nullified while estimating the difference in the measurements. Thus, in such an embodiment the time varying signals received by the processing unit 198 are processed and features of the signal are extracted. In this embodiment, the features of the signal include the baseline level and the peak height (corresponding to notch depth). Further, the extracted peak height is compared against the pre-determined size of the notch 28. As the measured notch height will be scaled depending on the clearance, the clearance can be determined using one of several methods. The methods include a lookup table, an analytical/physics based model, or a curve fit function. As described above, a plurality of such reference features may be employed and through the pre-determined size of such reference features the processing unit 198 determines the clearance necessary to provide the measured scaling of the reference features. Therefore, any measurement error that for example introduces a fixed offset over a relatively long time (non-time varying, or slowly varying error)

will be eliminated since the processing is done using the difference in measurements and not the absolute value of the measurements.

Thus, by interrupting the continuity of the continuous surface geometry of the rotating component 14 by the reference features, the clearance measurement system 12 converts direct current based capacitive measurements between the rotating component 14 and housing 16 to time-varying capacitive measurements. More particularly, interruption of the continuity of the continuous surface geometry through a reference feature introduces a spike in the signal produced by the capacitive probe that can be used for self calibrating the sensing system and ensure that measurements are not affected by signal drifts.

As discussed earlier, such time varying capacitive measurements are utilized to estimate the clearance between the rotating component 14 and housing 16. In certain embodiments, the processing unit 198 may employ a look-up table, or a calibration curve, or other techniques for estimating the clearance based upon the measurement difference between the sensed capacitances and pre-determined sizes of the reference geometries disposed on the rotating component 14. Further, a clearance control unit 202 may be coupled to the processing unit 198 for controlling the clearance between the rotating component 14 and housing 16 based upon the clearance estimated by the processing unit 198.

The various aspects of the method described herein have utility in different applications. For example, the technique illustrated above may be used for measuring the clearance between rotating and static components in a steam turbine. The technique may also be used in certain other applications, for example, for measuring clearance between stationary and rotating components in generators. As noted above, even more generally, the method described herein may be advantageous for providing accurate measurement of radial clearance between objects through sensors by converting direct current based capacitive measurements between the stationary and rotating components to time-varying capacitive measurements based on at least one reference feature interrupting the continuous surface geometry of the rotating component. Further, the disclosed embodiments are particularly advantageous to provide a self-calibrating sensor system for accurate clearance measurement of parts, even in operation and over extended periods of time, enabling better clearance control in parts while in operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A radial clearance measurement system, comprising:
   one or more reference features disposed on a rotating component having an otherwise continuous surface geometry, wherein the rotating component is subject to a range of axial displacement along an axis about which the rotating component rotates;
   a radial clearance sensor disposed on a housing held relatively stationary relative to the rotating component, wherein the radial clearance sensor is configured to generate a signal indicative of capacitance between the radial clearance sensor and the rotating component, the radial clearance sensor comprising:
      a probe tip comprising an electrode, wherein the electrode comprises a length along the axis greater than the range of axial displacement of the rotating component, wherein an aspect ratio of an axial length of at least one of the one or more reference features on the rotating component to an axial length of the probe tip ranges from about 1:2 to about 1:8;
   a processing unit configured to process the signal to estimate a clearance between the rotating component and the housing.

2. The radial clearance measurement system of claim 1, wherein the radial clearance sensor is configured to generate the signal while the rotating component moves relative to the housing.

3. The radial clearance measurement system of claim 1, further comprising:
   an excitation source configured to supply excitation signals to the radial clearance sensor; and
   a phase detector configured to detect a plurality of reflected signals and to perform a plurality of phase measurements to determine a phase between each of the reflected signals and the respective excitation signals.

4. The radial clearance measurement system of claim 1, wherein the one or more reference features comprise a first notch having a first depth and a second notch having a second depth different than the first depth.

5. The radial clearance measurement system of claim 1, further comprising a clearance control unit coupled to the processing unit for controlling the clearance between the rotating component and the housing based upon the clearance estimated by the processing unit.

6. The radial clearance measurement system of claim 1, wherein the electrode comprises a rectangular head, and wherein the width of the rectangular head is less than a corresponding width of the one or more reference features.

* * * * *